May 28, 1935. J. R. COE Re. 19,590
METHOD AND MILL FOR ROLLING METAL
Original Filed Sept. 28, 1932 7 Sheets-Sheet 1
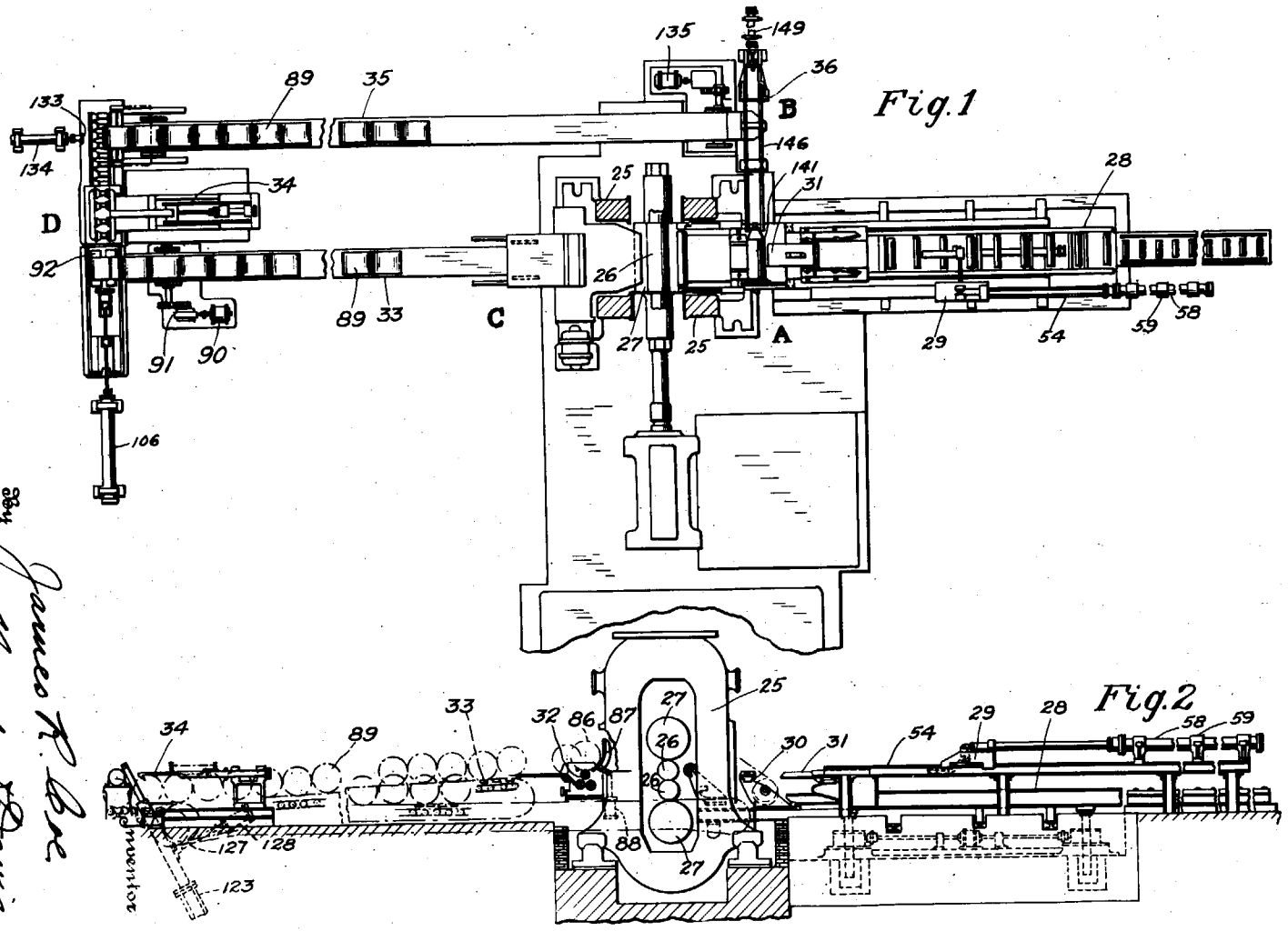
Inventor
James R. Coe
By Wooster & Davis
Attorneys May 28, 1935. J. R. COE Re. 19,590
METHOD AND MILL FOR ROLLING METAL
Original Filed Sept. 28, 1932 7 Sheets-Sheet 2
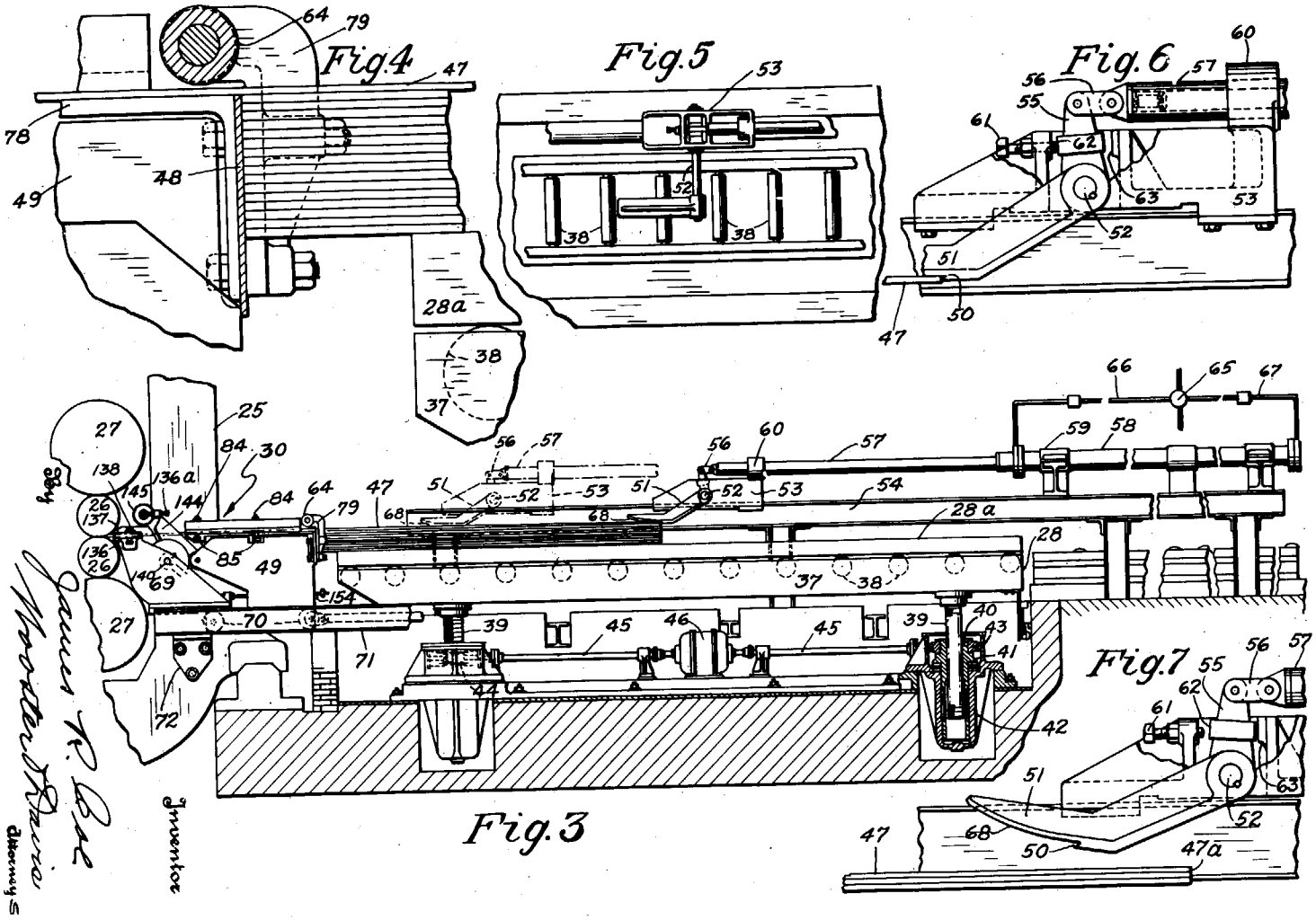
Inventor
James R. Coe
By Wooster & Davis
Attorneys May 28, 1935. J. R. COE Re. 19,590
METHOD AND MILL FOR ROLLING METAL
Original Filed Sept. 28, 1932 7 Sheets-Sheet 3
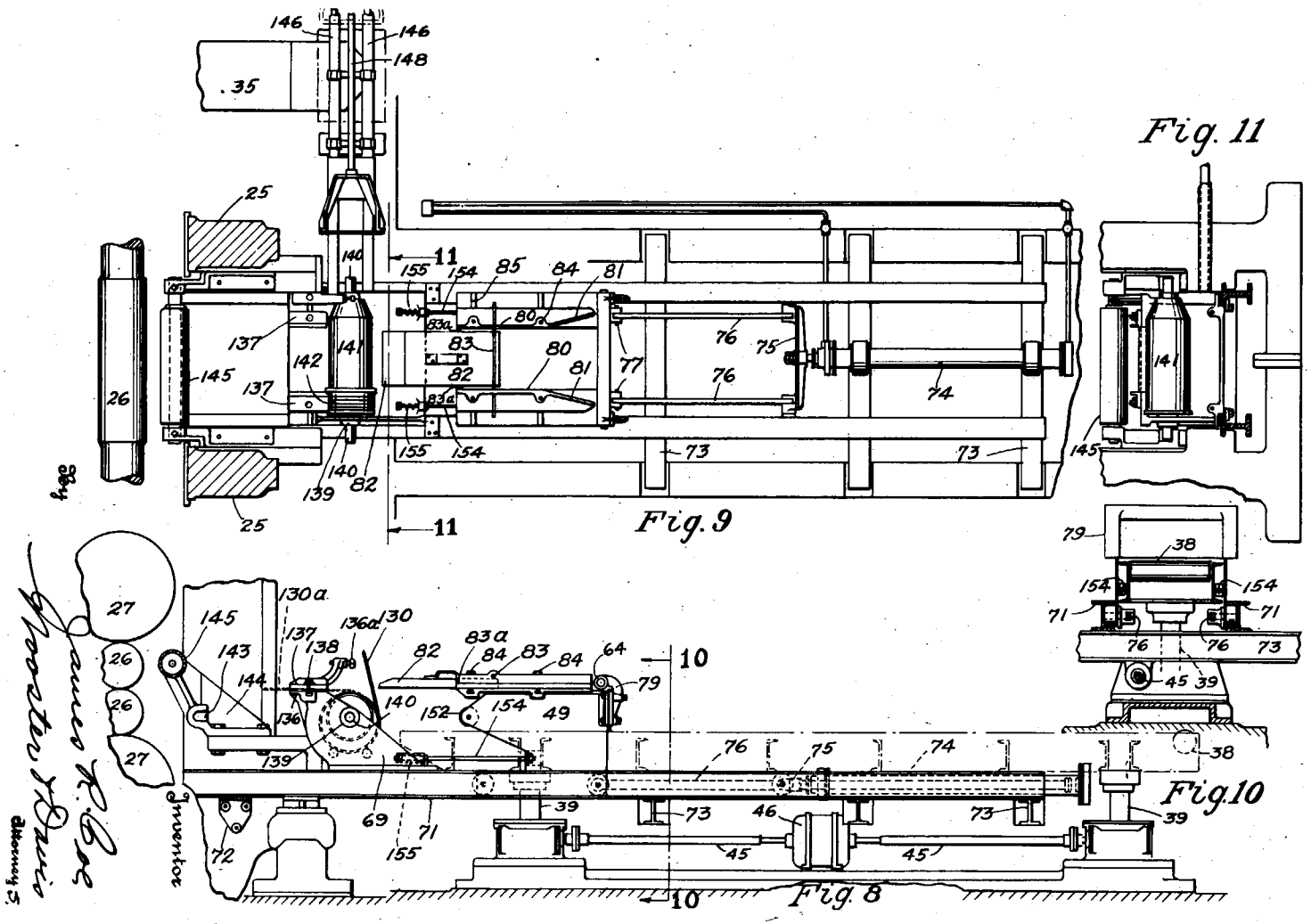

METHOD AND MILL FOR ROLLING METAL
Original Filed Sept. 28, 1932 7 Sheets-Sheet 4
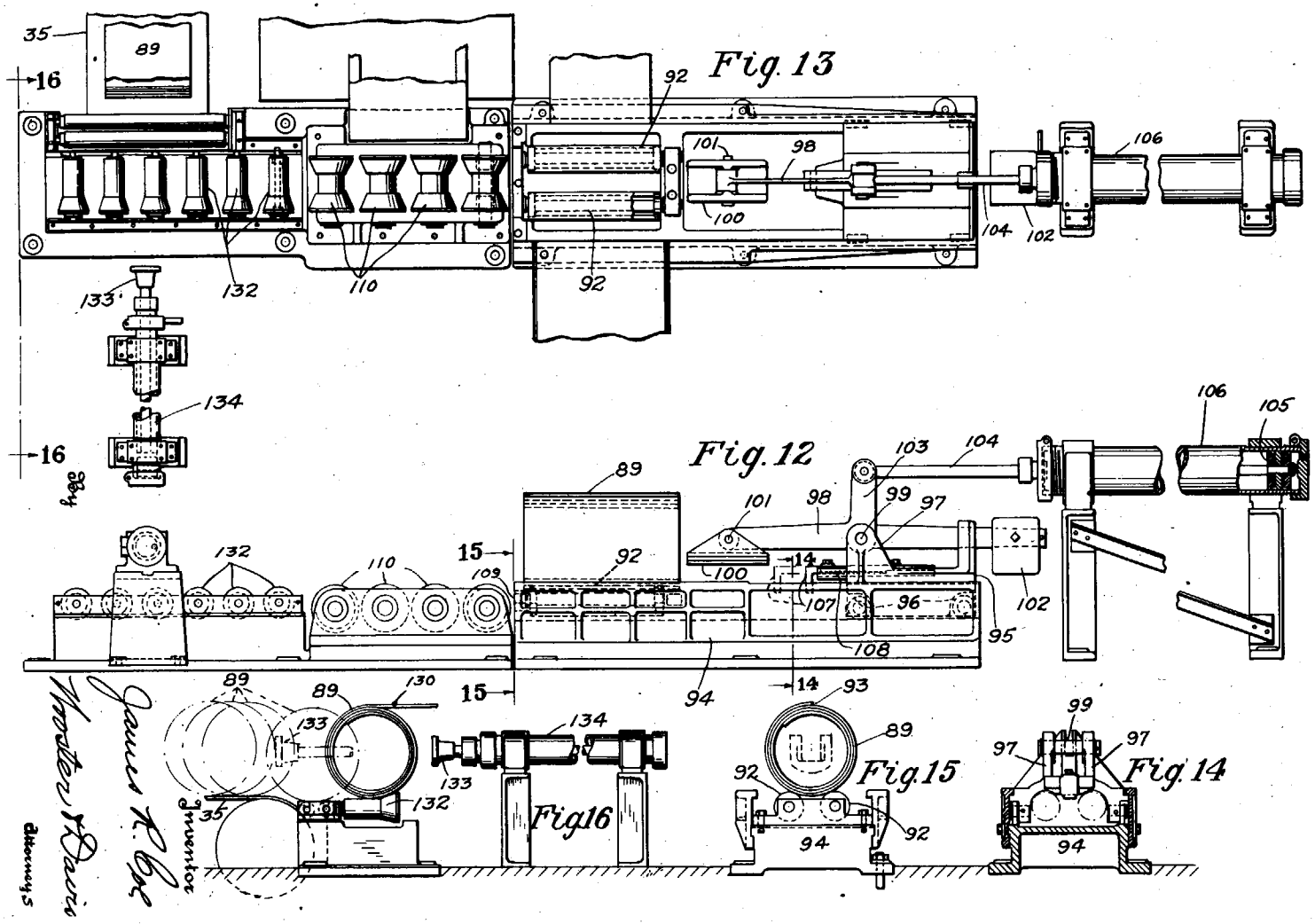

May 28, 1935. J. R. COE Re. 19,590
METHOD AND MILL FOR ROLLING METAL
Original Filed Sept. 28, 1932 7 Sheets-Sheet 5
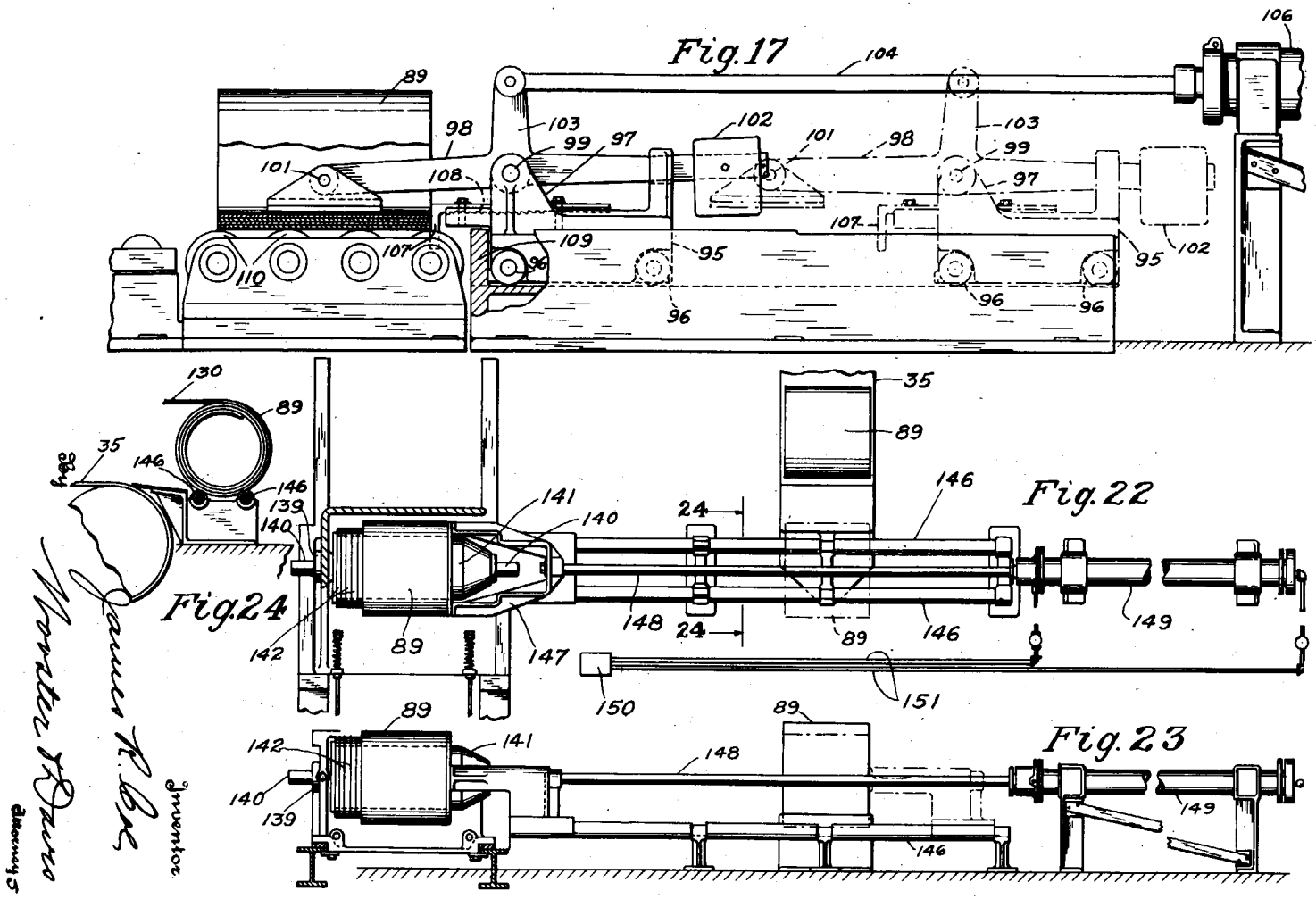
Inventor
James R. Coe
By Worster & Davis
Attorneys May 28, 1935. J. R. COE Re. 19,590

METHOD AND MILL FOR ROLLING METAL

Original Filed Sept. 28, 1932 7 Sheets-Sheet 6

Inventor

James R. Coe

By Wooster & Davis

Attorneys

May 28, 1935. J. R. COE Re. 19,590
METHOD AND MILL FOR ROLLING METAL
Original Filed Sept. 28, 1932 7 Sheets-Sheet 7
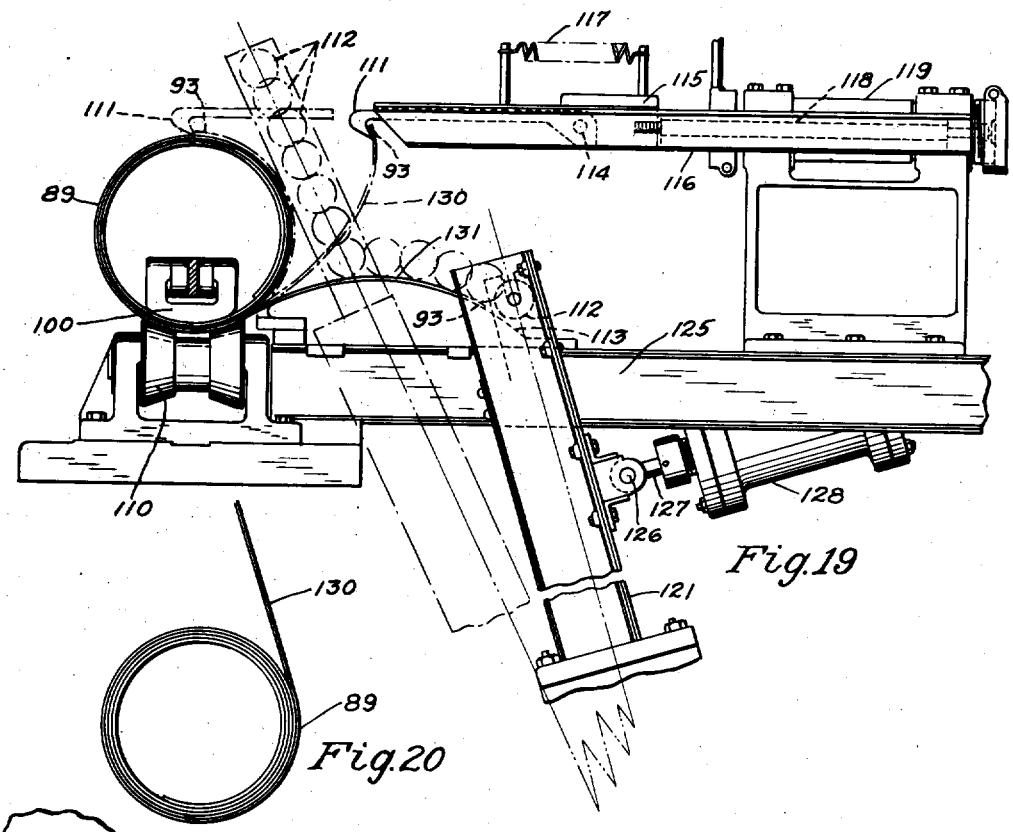
Fig.19
Fig.20
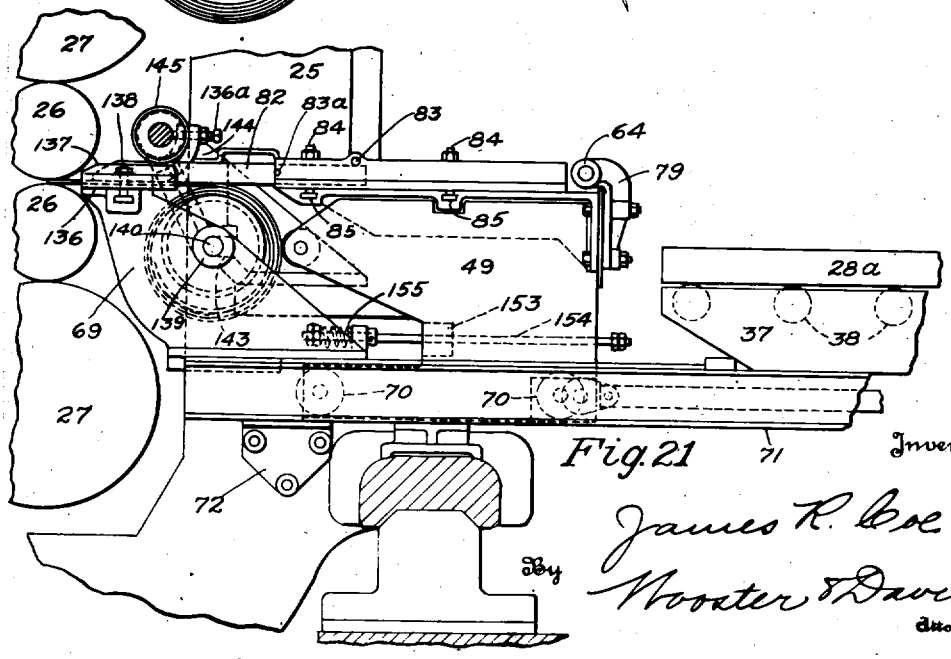
Fig.21
Inventor
James R. Coe
By Wooster & Davis
Attorneys.

Reissued May 28, 1935

Re. 19,590

UNITED STATES PATENT OFFICE 19,590

METHOD AND MILL FOR ROLLING METAL

James R. Coe, Watertown, Conn., assignor to The American Brass Company, Waterbury, Conn., a corporation of Connecticut Original No. 1,925,896, dated September 5, 1933, Serial No. 635,216, September 28, 1932. Application for reissue October 10, 1934, Serial No. 747,794

35 Claims. (Cl. 80—32)

This invention relates to a method and mill for rolling strip metal, and has for an object to provide an improved mill for rolling strip metal which may be employed to roll heavy bars from approximately a half inch thick, 18" to 24" wide, and 18 ft. long to a thickness of approximately one-sixteenth of an inch, and at which gauge the strips will be approximately 144 ft. long. To accomplish this reduction it is necessary to pass brass or copper through the rolls four times, while with more refractory metals it may require a greater number of passes.

As considerable time is necessary to adjust the rolls and auxiliary mechanism to effect the desired reduction, it is apparent that to avoid waste of rolling time a considerable number of bars or strips should be passed through the rolls after each adjustment, and it will also be apparent that space must be provided for the storage of these bars together with mechanical means for handling them into and out of the storage zone, as they are too heavy to be handled by a man, weighing anywhere up to several hundred pounds.

I have found that economical operation of such a mill requires the rolling of at least 50 bars or strips in a batch, and I have also found that it is desirable to store this metal between successive rolling operations in the form of coils, not only because the coils require a minimum amount of floor space for this storage, but because the metal runs straighter through the rolls when coiled than it does when rolled out into flat strips of great length.

In order to make possible the re-rolling of hard metal from the coiled form, I have found it necessary to provide mechanical means for straightening out the last or tail end of the coil, and mechanical means for entering or sticking this tail end for the next pass or further reduction, because it would be physically impossible for a man or men to perform either of these operations as in accordance with past practice when rolling comparatively small light weight coils of soft annealed metal. Also owing to the weight of the bars and the difficulty encountered in entering them or sticking them into the rolls, it is impossible for the men to handle the flat strips as delivered to the mill, and it is therefore necessary to provide a mechanical means for elevating and sticking these bars into the mill.

Means for accomplishing the various operations described above, and the arrangement of these means in connection with the mill together with this method of rolling strip metal form my invention, a chief object of which is to reduce the amount of labor and the loss of rolling time to a minimum.

In actual operation the bars are placed in a vertical pile on an elevator in front of rolls and raised until the top bar is on a level with the line of contact between the rolls and slightly above the top edge of a guide table, in which position its back end is engaged by an air operated pusher by which it is pushed forward until the front end engages with the working rolls and enters between them. After passing through the rolls, which may be of any standard design, altho they are preferably of the 4-high type to permit heavy reductions, the metal passes through a suitable coiler, such as a 3-roll coiler equipped with a power operated ejector, by means of which the coils are delivered on to a travelling conveyor running away from the rolls a sufficient distance to provide storage room for a given number of coils, in the present instance about 25 coils, each approximately 2 feet in diameter.

At the back end of this conveyer the coils are deposited one by one on to horizontal supporting rolls and turned by an operator until the back or tail end of the coil is on top, and it is then pushed sidewise by a suitable pusher to a position in front of a coil opener. In this position they are clamped against rotary movement while mechanical means engages the back or tail end and pulls it away from the coil and rolls it over a form to such shape that when the tail is released by the opener it will project tangentially from the coil a sufficient distance to permit its being again entered and stuck into the rolls. After the tail end has been straightened the coil is released and moved to a position in front of a return conveyor on which it is pushed by suitable means.

This return conveyor extends back toward the rolls and provides additional storage room for say another 25 coils, the first of which will be back at the rolls ready for re-rolling when the last of the original batch of 50 bars or coils has passed through the rolls and the coiler. At this time the rolls and coiler will be adjusted for the next pass, and if the metal is fed to the rolls in the form of straight bars the elevator is lowered and a guide table or carriage carrying a support for a coil is drawn back from the rolls into a position to receive the coils of the metal as they are delivered by the return conveyor. This guide carriage has means for guiding the metal into the rolls both when it is in the form of bars for the first pass or in the form of coiled strips for succeeding passes, and the coils delivered by the return conveyor are placed one by one in position in front of the rolls with the straightened tail end in proper position for sticking in the rolls. Mechanical means then stick the end into the rolls and the batch of coils is again rolled with the new setting of the rolls. The metal is then again coiled as it leaves the rolls, the coils are deposited on the storage conveyors, the tail end straightened and after the batch has been rolled the rolls are again reset and the coils of the batch again brought to the rolls and re-rolled and re-coiled. Thus in this operation the batch is rolled with a given setting of the rolls, stored on the conveyors, the rolls reset and then again rolled with the resetting, and these operations are carried on as many times as is required to reduce the metal to the desired thickness.

In the accompanying drawings are shown mechanisms and an arrangement of these mechanisms for rolling these strips of metal as above outlined.

In these drawings:

Fig. 1 is a top plan view showing somewhat diagrammatically the relative arrangement of the various mechanisms;

Fig. 2 is a side elevation thereof;

Fig. 3 is a partial side elevation and partial vertical section of the means for feeding and sticking the bars into the rolls;

Fig. 4 is a vertical section of the front end thereof;

Fig. 5 is a top plan view of the pusher head;

Fig. 6 is a side elevation thereof on a larger scale showing a pusher in position to engage the end of a bar;

Fig. 7 is a similar view showing a pusher raised above the bar;

Fig. 8 is a side elevation of the feeding and sticking mechanism as used for a coil of metal;

Fig. 9 is a top plan view thereof;

Fig. 10 is a transverse section substantially on line 10—10 of Fig. 8;

Fig. 11 is a transverse section substantially on line 11—11 of Fig. 9;

Fig. 12 is a side elevation of means for clamping the coils to hold them for straightening out the tail end, the clamp being in retracted position;

Fig. 13 is a top plan view thereof;

Fig. 14 is a transverse section substantially on the line 14—14 of Fig. 12;

Fig. 15 is a view substantially on the line 15—15 of Fig. 12;

Fig. 16 is an end view as indicated by line 16—16 of Fig. 13;

Fig. 17 is a side elevation of the clamp showing it in position for holding a coil, parts being in section to more clearly show the construction;

Fig. 19 is a side elevation of the upper portion of the device showing the position assumed in straightening the end of the coil;

Fig. 20 is an end view of the coil with the tail end straightened;

Fig. 21 is a side elevation of the coil supporting, guiding and sticking mechanism at the front of the rolls;

Fig. 22 is a top plan view of the mechanism for transferring the coils from the return conveyor to the coil supporting and feeding means in the front of the rolls;

Fig. 23 is a front elevation thereof; and

Fig. 24 is a cross section on line 24—24 of Fig. 22.

Figure 18:
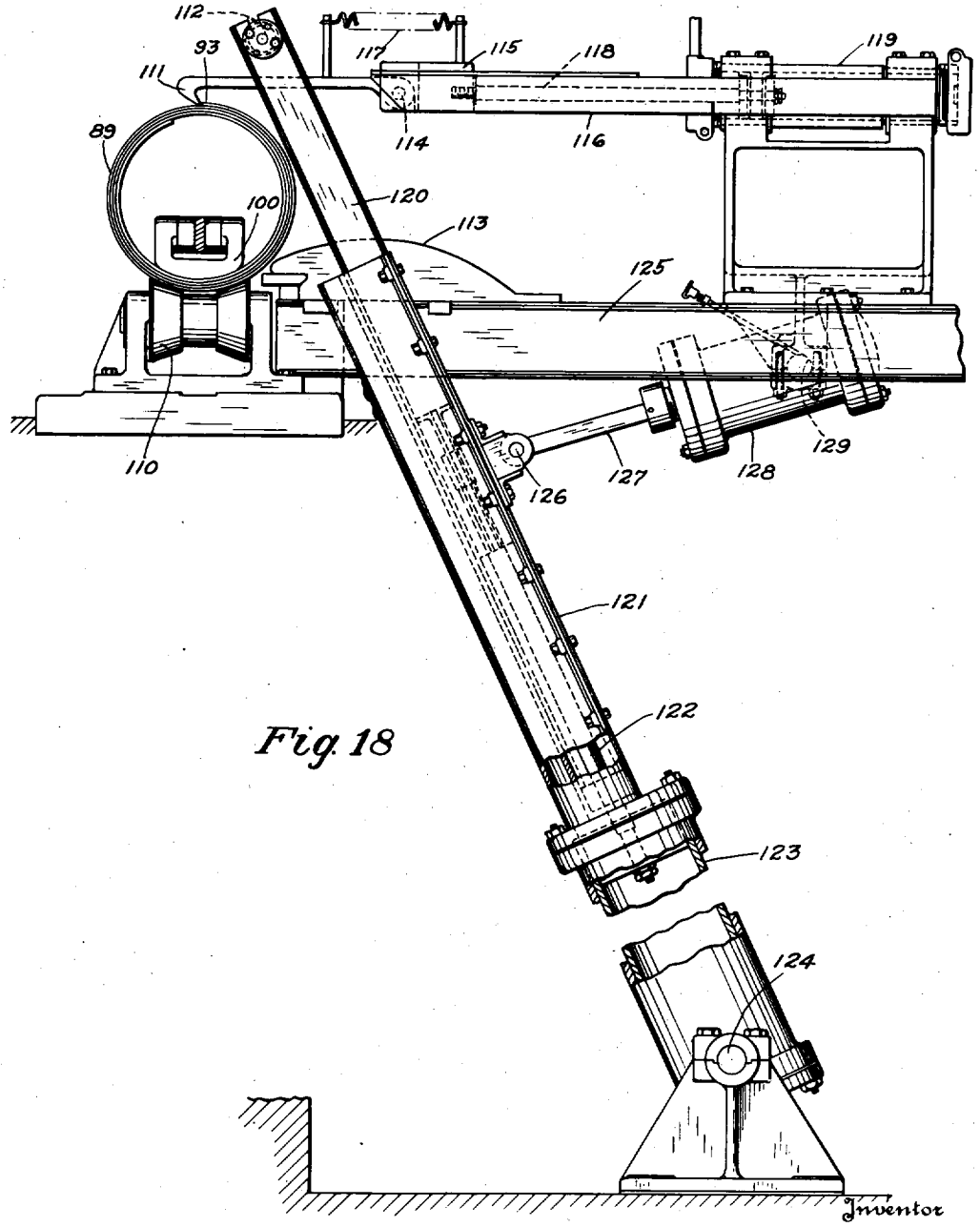
Fig. 18 is a side elevation of the device for straightening the tail end of the coil, showing it in the position of just gripping the end of the coil preparatory to the straightening operation.

On the assembled drawings Figs. 1 and 2 are shown the relative positions of the various mechanisms in respect to the rolls and to each other. The rolls are mounted in the usual housings 25, and as indicated above are preferably of the 4-high type, although not necessarily so, comprising smaller working rolls 26 and larger backing rolls 27. At the front of the rolls is the elevator 28 for carrying a stack of metal bars to be rolled piled one on top of the other and a pusher mechanism 29 for pushing the bars into the rolls. Also at the front are the guide table 30 and the coiled metal sticker 31. To the rear of the rolls is the coiler 32 and the storage conveyor 33 to receive the metal from the coiler and transfer it rearwardly to the device 34 for straightening the tail end of the coil. After the tail end is straightened the coil is deposited on the second storage conveyor 35 running forwardly to the transfer mechanism 36 by which the coils are successively transferred to the coil supporting means associated with the table 30.

As indicated above, before the first pass through the mill the metal is in the form of straight bars approximately a half inch thick and eighteen feet long. In width they may be anywhere up to 24 or 30 inches. They are delivered to the mill piled one on the other. Referring to Figs. 3 to 7, the flat metal elevator 28 comprises a platform consisting of a channel frame 37 on which are mounted idler rollers 38. The platform is mounted on two screws 39 threaded into rotatable nuts 40 carried on thrust bearings 41 in a supporting bracket 42. The nuts may be revolved in either direction by means of worm wheels 43 engaging with worms 44 driven by shafts 45 connected to an operating motor 46. In regular operation the vertical piles of metal strips 47 are placed on the rolls 38 on a table 28a and pushed forward toward the mill 25 until the front end engages the stop plate 48 on the rear section 49 of the guide table to be more fully described later. These bars are lifted by means of the elevator 28 operated by motor 46 until the top bar 47 is above the top of the guide table and directly in line with the line of contact between the work rolls 26 as indicated in Figs. 3 and 4.

In this position the top bar is engaged at its rear end by the heel 50 on the shoe or slipper 51 keyed to a shaft 52 mounted in bearings in a cross head 53. This cross head is mounted to slide on a suitable guide, such as the I-beam 54. Also mounted on the shaft 52 is an upright arm 55 connected by a link 56 to a piston rod 57 operated by a piston (not shown) in an air cylinder 58 mounted in suitable brackets 59, which may also be mounted on the beam 54 on which the cross head 53 may slide back and forth. The cross head carries a supporting bearing 60 for the piston rod 57 and in which it is free to slide, and the head also carries an adjusting screw 61 adapted to be engaged by a stop 62 on the arm 55 to limit the forward movement of this arm and therefore the downward movement of the shoe 51 during the forward or pushing stroke.

The cross head also carries an abutment 63 to limit the backward movement of the arm 55 and the uplift of this shoe 51 during the backward or return stroke for engagement with the succeeding bar or strip of metal when raised into the sticking position by the elevator 28. When the top bar 47 is pushed forwardly by the shoe 51 it passes under a guide roller 64 on the section 49 of the guide table and is therefore prevented from jumping upwardly. This roller also prevents more than one bar at a time being pushed into the mill. The operation of the piston in the cylinder 58 may be controlled by any suitable means, such as a valve 65 controlling the passage of air through the pipes 66 and 67 leading to opposite ends of the cylinder.

It will be evident that when the cross head 53 is forced forwardly by the piston rod 57 the arm 55 is forced forwardly against the stop 61 lowering the shoe 51 to such a position that its upwardly curved forward portion 68 rests on the top of the upper bar 47 and the heel or shoulder 50 will engage the rear end 47a of this bar as indicated in Figs. 3 and 6. As the cross head is advanced the shoulder 50 pushes the top bar 47 forwardly into the rolls 26 and therefore sticks the forward end into the mill. After the bar has been properly started in the mill the cross head 53 is withdrawn or shifted backwardly. As this is done by pull on the rod 57 it will be evident that during the backward movement the lever 55 is against the stop 63 and the shoe 51 is raised above the pile of bars as indicated in Fig. 7. After the bar 47 has passed off the pile of bars the elevator 28 may be operated to raise the next bar to the proper level or above the edge of the stop 48, and then the cross-head 53 and shoe 51 again advanced to push this second bar into the mill and so on until all the bars have been rolled.

The guide table and coil sticker 30 and 31 is composed of two sections 49 and 69, and section 49 is mounted on wheels 70 running between the flanges of I-beam 71, the front ends of which are connected to the roller housings 25 by suitable brackets 72, while the rear ends are supported on cross beams 73. The beams 71 are spaced sufficiently far apart to allow the elevator 28 to rise and fall between them and these beams support an air cylinder 74 connected to the carriage or table section 49 by means of a cross head 75 and links 76 pivoted to this carriage at 77, and form means by which the carriage 49 may be shifted toward and from the rolling mill. This carriage or section 49 carries the back plate 48 against which the forward ends of the flat bars abut as described above when the elevator is in use, at which time the guide table and associated elements of the coiled metal sticker have been pushed in to the extreme forward position against the rolls. While the flat bars are being stuck into the rolls this plate 48 serves to hold back all the bars except the top one indicated at 47, which is raised by the elevator to a level just above the edge of this plate and on a level with the line of contact between the working rolls 26. As the top bar passes to the mill it is guided on the top 78 of the guide table and under the roll 64 attached to this guide carriage and table by the brackets 79. This roll 64 makes it impossible for more than one bar to enter the rolls at the same time even though the elevator may be raised too high.

On the top of the guide table or section 49 are mounted two side guides 80 inclined outwardly at the forward ends 81, and they may be adjusted laterally, by loosening bolts 84 having heads in transverse T-slots 85, to correspond with the width of the bar being rolled. They are of a sufficient length to cause the metal to enter the rolls in a straight line and perpendicular to the axis of the roll. These guides are used as guides for the metal only when flat strips are being rolled and are used to position a wooden peg 82 when coiled strips are being rolled. This wooden peg 82 is supported on the guides 80 by a pivot rod 83a and extends under a bar 83. This wooden peg 82 acts to hold down the free end of a coil of metal as it is being stuck into the rolls as will be more fully disclosed later. As indicated above this peg is removed when the flat straight bars indicated at 47 are being rolled so that these bars are guided by the guides 80.

The metal strip as it leaves the rolls passes through the rolls of the coiler 32 and after a coil has been completed as indicated at 86, Fig. 2, it is forced from the coiler by any suitable power means, such as an ejector 87 operated by an air piston 88 and passes on to a travelling storage conveyor 33, which is preferably of the slat type and runs directly away from the rolls and coiler a sufficient distance to provide storage room for any desired number of coils, in the present instance 25 coils, indicated at 89 of approximately 2 feet in diameter, this conveyor being operated by any suitable means, such as a motor 90 operating through suitable gearing 91.

At the rear end of this conveyor is located a coil opener or device for pulling away the last or tail end of the coil and straightening it so that it can be stuck into the rolling mill for the next rolling operation. At the rear of the conveyor 33 are mounted two horizontal rolls 92 mounted on the roller bearings and on to which the coils are delivered in succession as they drop off the rear end of the conveyor 33. These rolls permit easy rotation of the coil by an operator to bring the exposed end of the coil indicated at 93 in Fig. 18, to the top of the coil. These rolls 92 are mounted in a floor stand 94 which also forms a track for a carriage or car 95 running on wheels 96. This carriage has upright horns 97 between which is mounted a 3-arm beam or lever 98 on a pivot 99. This lever 98 carries on its front arm a pressure plate or shoe 100 which is pivoted to the arm at 101 and is transversely curved on its lower face to fit the curvature on the inside of a coil of metal, while a counterweight 102 is adjustably mounted on the rear arm of this lever. The vertical arm 103 of the lever is connected to a piston rod 104 by which it may be operated back and forth by the piston 105 in an air cylinder 106. The car 95 carries a pusher 107 which is adjustable as indicated at 108 on the carriage to suit various widths of metal forming the coils.

In normal position as indicated in Figs. 12 and 13 this carriage 95 is retracted so that the shoe or clamp 100 is located to the right of the rolls 92 when the coil from the conveyor 33 is deposited on these rolls as indicated in Fig. 15. This coil is then rotated by an operator to bring the free end 93 at the top. Air is then supplied to the cylinder 106 to force the piston 105 forwardly. As the counter-weight 102 weighs considerably more than the pressure plate or clamp 100 and is sufficient to overcome friction of the wheels 96 of the carriage, forward motion of the piston rod 104 will move the car 95 to the left with the pressure plate 100 in its upper position until the pusher 107 strikes the edge of the coil 89 at which time the plate or clamp 100 will be within the coil 89. Continued forward movement of the rod 104 will move both the coil and the car 95 to the left until the front end of the car engages the stop 109, as indicated in Fig. 17, on the stand 94. This will arrest movement of the car and therefore the pressure of the rod 104 will turn the beam 98 about the pivot 99 and will press the clamp or plate 100 against the inner wall at the lower part of the coil as indicated in Fig. 17, and will clamp the coil on to the heavy rolls 110, which rolls are directly in front of the mechanism for opening and straightening the tail end of the coil.

This device for opening and straightening the tail end of the coil is shown more clearly in Figs. 18 and 19. In these figures the coil 89 is shown clamped by the shoe 100 against rotation on the heavy rollers 110. The coil opener proper consists essentially of two mechanisms, the first being a hook 111 designed to engage with the exposed end 93 of the metal coil and pull it back in a substantially horizontal plane beyond the path of the second mechanism which consists of a roller 112 arranged to move down in an inclined plane between the coil and the pull back device 111 until the metal is in contact with an interchangeable form 113. This roll is then moved back and down to bend and roll the metal over this form, the shape of which is such that the metal will spring back to a straight line extending tangentially from the coil when released by the roller. The hook 111 is pivoted at 114 on a cross head 115 slidably mounted in channels 116, and the hook is normally held in a horizontal position by spring 117. The cross head 115 is rolled back and forth by piston rod 118 operated by a piston in an air cylinder 119. The roller 112 is mounted between channels 120 forming the sides of a sliding frame and is movable up and down in the rocking frame 121 by means of a piston rod 122 operated by a piston in an air cylinder 123 mounted to rock about the pivots 124, the form 113 is carried by a channel frame 125 between the side members 120 in which position it will not interfere with the vertical or horizontal positioning of the roll 112. The frame 121 is pivotally connected at 126 to a piston rod 127 operated by a piston of an air cylinder 128 mounted to rock on pivots 129.

In the operation of straightening the tail end of the coil after the hook 111 engages the free end of the coil as indicated in Fig. 18 the hook is drawn to the right by the air cylinder 119 as indicated in Fig. 19. This pulls the free end or tail portion to the position 130 in Fig. 19 at which time the roller 112 is drawn downwardly against this drawn out tail portion, as indicated by the broken line, by means of the air cylinder 123. This roller 112 presses the tail piece 130 against the form 113 and then the air cylinder 128 draws the frame 121 and the roller 112 to the right as shown in Fig. 19. Thus while the cylinder 123 holds the roller 112 tightly down against the strip 131 on the form 113 the cylinder 128 draws it to the right and therefore rolls the metal over this form. The form is of such shape that when the end of the coil is released after the roller 112 passes over it, it will swing back to the straight position as shown in Fig. 20.

After this tail end of the coil has been straightened the coil is released through the air cylinder 106 withdrawing the piston rod 104 to the right as viewed in Figs. 12 and 17. The first effect of this, of course, is to raise the clamp 100 from the coil and release it, and then continued movement of the rod 104 withdraws the clamp and the carriage 95 to the position of Fig. 12 where it is ready for the next coil.

The coil on which the tail end has just been straightened is run on the rollers 110 and 132 to a position in front of the return storage conveyor 35 from which position it can be pushed on to this conveyor by the pusher 133 operated by the air cylinder 134.

This conveyor 35 extends substantially parallel to the conveyor 33 and spaced to one side thereof so as to conduct the coils with the tail ends 130 pulled out straight back to a position forwardly of the rolls 26, and this conveyor may be operated by any suitable means, such as a motor 135. This conveyor is of a sufficient length to store any given number of coils, in the present instance 25, so that with the conveyor 33, 50 coils can be stored by these conveyors between each setting of the rolls 26. After the entire batch of 50 bars have been rolled and coiled as described the rolls 26 can be set for the next rolling operation and the wooden peg 82 can be mounted between the guides 80 for holding the free end of the coil while sticking it in the rolls.

A section 69 of the guide table and coil sticker is in the form of a carriage slidably mounted on the track-beam 71 and the upper front end of which, indicated at 136, forms a short guide table on which the side guides 137 are adjustably mounted as by bolts 138 operating in transverse T-slots. Mounted in a bearing 139 on one side of the carriage 69 is a shaft or spindle 140 which supports a revolving horn or drum 141, and a number of spacing rings 142 may be placed on this shaft between the drum and the side of the carrier and can be used to locate the drum to suit the width of the metal being rolled. As shown, the shaft 140 projects a certain distance beyond the drum 141 and the bearing 139 and therefore when the carriage 69 is advanced to its forward position the ends of this shaft engage in the bearings 143 on brackets 144 fastened between the roll housing to limit forward movement of the carriage or sticker, and also support the coil being rolled. Adjustable stop 136a engages bracket 144 to limit forward movement of the carriage 69. This is the position after the coil sticker has been advanced from the loading position indicated in Figs. 9 and 10 to the sticking position shown in Fig. 21, and also in Fig. 3. Brackets 144 carry an idle roller 145 to hold a wooden peg 82 down in its proper position when in the forward position.

The mechanism for feeding the coils from the conveyor 35 to the coil sticker is shown more clearly in Figs. 11, 22 and 23. At the discharge end of the conveyor 35 are two horizontal rolls 146 on which the coils 89 with the tails 130 straightened out are deposited from the conveyor 35. These rolls 146 are at right angles to the track-beam 71 and form guides on which the coils 89 can be pushed sidewise from the conveyor 35 to the horn or coil support 141. For this purpose a pusher 147 is operated back and forth by a piston rod 148 connected to a piston in an air cylinder 149. An operator operating the valve 150 may control air pressure through the pipes 151 for supplying air to the opposite ends of the cylinder 149. As the coil 89 is deposited from the conveyor 35 to the rolls 146 it is turned to a position by an operator with the straightened tail end 130 in an upright position as shown in Fig. 8. Then the operator advances the pusher 147 and pushes the coil on to the drum 141. An operator then advances the carriage 49 by means of the cylinder 74 which causes the wooden peg 82 to push the tail end 130 down into the horizontal position on top of the short table 136 as indicated in dotted lines 130a, Fig. 8. The free end in this position is between the guides 137. As the carriage 49 continues to move forwardly a pressure roller 152 carried by it engages with and pushes forward the other section 69 of the coil sticker to the position of Fig. 21 bringing the shaft 140 into the bearings 143. This forward movement of the sticker sticks the free end of the coil between the rolls 26.

The carriage 49 also carries brackets 153 through which drag bolts 154 connected to the carriage 69 extend and provide a lost motion connection between the two carriages 49 and 69. The coil springs 155 are placed on the inner end of these rods and due to this lost motion connection, when the carriage 49 is retracted it will be drawn back some distance before the coil sticker carriage 69 is shifted, and therefore the coil sticker 69 is drawn back only to a half-way position to position the drum 141 in alignment with the rolls 146 and pusher 147, while the carriage 49 is drawn back the full distance. By this construction the parts of the two carriages 49 and 69 are in close engagement when shoved forward between the roller housings as indicated in Fig. 21, but due to lost motion on the connecting bolts 154 the rear carriage 49 can move back a considerable distance before the bolts 154 move the second carriage 69 to cause it to be retracted to the loading position. This operation therefore provides a clearance space through which a coil of metal from the return conveyor 35 can be pushed sidewise on to the horn 141 with the tail end 130 in the upright position while the wooden peg 82 is drawn backwardly out of the way. The coil is then in a position for advancing the wooden peg 82 to force the free end of the coil down on to the short table 136 in position for sticking it between the rolls 26 and the advancing of the entire sticker mechanism until the front end of the metal again engages the work rolls at which time the wooden peg 82 lies under the idler roll 145 and holds the metal firmly down upon the guide table 136 between the adjustable side guides 137 to thereby prevent any wrinkling or buckling of the metal during the rolling operation.

It will therefore be seen from the foregoing that a batch of heavy coils of metal, say 50, can be rolled with a given setting of the rolls, and then the rolls and coiler reset and the batch of coils again passed through the rolls and so on until the proper reduction in thickness has been secured. Also that as the coils are handled entirely by power operated devices heavy coils which would otherwise be too heavy to handle, can be easily manipulated. As there is storage room for a considerable number of coils, the reductions can all be secured on a single set of rolls with a minimum loss of rolling time.

In operating this mill and associated mechanisms, controls for the bar elevator 28, the bar pusher 51 and the coil sticker 30 can be located for convenient operation by an operative stationed at A, Fig. 1. At station B an operator can operate controls for the coil pusher 36, and the conveyor 35. This man also turns the coils as they come off the conveyor 35 to position the straightened tail ends 130 in the upright position so it will be properly positioned as it is pushed on to the drum 141.

An operator at station C operates controls for setting the rolls 26, setting the coiler 32, operating the coil ejector 86, and for controlling the conveyor 33.

An operator at station D can operate controls for the coil transfer and clamp 95, 100; the coil opener 34, the pusher 134 for pushing opened coils on to the conveyor 35, and he may also have controls for the conveyor 33. This man also turns the coils before they are clamped by clamp 100 to bring the tail end 93 into proper position for the opening device. The various controls are not shown on the drawings for the sake of clearness as they are the usual electrical controls for the electrically operated devices and the usual valves for the air operated devices.

Having thus set forth the nature of my invention, what I claim is:

1. A method of rolling metal which comprises passing metal bars through a rolling mill, coiling the strip into a coil as it leaves the mill, storing a plurality of the coils on a conveyor, straightening the tail end of the coil so that it sticks out straight from the coil, storing a plurality of coils with straightened ends on a conveyor, conveying said coils one at a time to the front of the mill, and again passing the coils through the mill after resetting the rolls thereof.

2. A method of rolling metal which comprises passing metal bars through a rolling mill, coiling the strips as they leave the mill, clamping the coils against rotation, pulling out the tail end of the coil and straightening, returning the coils in succession to supporting means at the front of the mill, and again passing the strips of the coils through the mill after resetting the rolls thereof.

3. A method of rolling metal which comprises passing a plurality of strips of the metal through a rolling mill in succession and with a given setting of the rolls, coiling the strips as they leave the mill, storing the coiled strips on conveyor means, resetting the rolls of the mill, transferring the coils in succession from the storage means to a support at the front of the mill, and again passing them through the reset mill.

4. In a device for rolling metal, a rolling mill, means at the front of the mill for feeding bars to the mill, means for coiling the strip as it leaves the mill, a conveyor for receiving the coil from the coiler capable of storing a plurality of coils, means for pulling out and straightening the tail end of a coil located adjacent the rear end of said conveyor, a second conveyor spaced laterally from the first and adapted to store a plurality of coils, means for transferring the coils from the straightening device to said second conveyor, means for supporting a coil at the front of the mill, and means for transferring the coils in succession from the second conveyor to said coil supporting means.

5. In a device for rolling metal, a rolling mill, means at the front of the mill for feeding the metal thereto, means at the rear of the mill for coiling the strip as it leaves the mill, a storage conveyor for a plurality of coils in position to receive the coils from the coiler, a second storage conveyor for a plurality of coils spaced laterally from the first conveyor, means for transferring coils from the first to the second conveyor, and means for transferring the coils from the second conveyor to a position in front of the mill.

6. In a device for rolling metal, a rolling mill, means at the front of the mill for supporting a coil of metal, means at the rear of the mill for coiling a strip as it leaves the mill, a storage conveyor for a plurality of coils extending rearwardly from the mill, a second storage conveyor at one side thereof, means for transferring coils from the first to the second conveyor, and means for transferring the coils in succession from the second conveyor to the support at the front of the mill.

7. In a device for rolling metal, a rolling mill, means at the front of the mill for supporting a coil of metal, means at the rear of the mill for coiling a strip as it leaves the mill, storage conveyors for a plurality of coils one extending rearwardly from the mill and the other at one side thereof, means for pulling out and straightening the tail ends of the coils, means for transferring the coils from the first to the second conveyor, and means for transferring the coils in succession from the second conveyor to the support at the front of the mill.

8. In a device for rolling metal, a rolling mill, means at the front of the mill for supporting a coil of metal, means at the rear of the mill for coiling a strip as it leaves the mill, storage conveyors for a plurality of coils one extending rearwardly from the mill and the other at one side thereof, means for transferring the coils from the first to the second conveyor, means for transferring the coils in succession from the second conveyor to the support at the front of the mill, and power operated means for sticking the tail end of coil between the rolls of the mill.

9. In a device for rolling metal, a rolling mill, means at the front of the mill for supporting a coil of metal, means at the rear of the mill for coiling a strip as it leaves the mill, storage conveyors for a plurality of coils one extending rearwardly from the mill and the other at one side thereof, means for holding a coil to prevent its turning, means for pulling out and straightening the tail end of the held coil, means for transferring the coils in succession from the second conveyor to the support at the front of the mill, and power operated means for sticking the straightened end of the coil between the rolls of the mill.

10. In a device for rolling metal, a pair of rolls, a support for a pile of flat bars one on the other in front of the rolls, an elevator mechanism for raising and lowering the support, and means for pushing the bars one at a time from the pile and sticking them between the rolls comprising a pivotally mounted shoe provided with a surface to rest on the top bar and a shoulder to engage the rear end of the bar, and means for advancing the shoe to feed the bar between the rolls.

11. In a device for rolling metal, a pair of rolls, an elevator at the front of the rolls for raising and lowering a pile of superimposed flat bars, a pusher device comprising a shoe for engaging the rear end of the top bar of the pile on the elevator, means for operating the shoe to remove the top bar from the pile and stick the bar between the rolls, and a guide means for the bar between the elevator and the rolls.

12. In a device for rolling metal, a pair of rolls, an elevator at the front of the rolls for raising and lowering a pile of superimposed flat bars, a pusher device comprising a reciprocating head, a shoe pivotally mounted on the head and provided with a shoulder to engage the rear end of a bar on the elevator, a lever connected to the shoe operating between stops to limit its movement in opposite directions, and a power operated means connected to the lever for operating it and the head in opposite directions.

13. In a device for rolling metal, a pair of rolls, means at the front of the rolls for feeding the metal thereto, a coiler at the rear of the rolls for coiling the strip as it leaves the rolls, a storage conveyor extending rearwardly from the coiler, means at the rear end of the conveyor for holding a coil in a given position, means for pulling out and straightening the tail end portion of the held coil, means for returning the coil to a position in front of the rolls, and means for sticking the straightened end between the rolls.

14. In a device for rolling metal, a pair of rolls, means for coiling a strip as it leaves the rolls, a conveyor for the coiled strips extending rearwardly from the rolls, supporting rolls for a coil at the rear end of the conveyor, means for clamping a coil on the rolls comprising a reciprocating car, a lever pivoted on said car, a clamping block carried by the forward arm of the lever, a counter-weight carried by the rear arm of the lever and considerably heavier than the clamping block, an upright arm on the lever, and power means connected to the latter arm for operating the lever and reciprocating the head.

15. In a device for rolling metal, a pair of rolls, means for coiling a strip as it leaves the rolls, a conveyer for the coiled strips extending rearwardly from the rolls, supporting rolls for a coil at the rear end of the conveyor, means for clamping a coil on the rolls comprising a reciprocating car, means carried by the car for pushing a coil longitudinally of its axis, a lever pivoted to the car, a clamping block carried by one arm of the lever, an overbalancing weight carried by the other arm, an upright arm on the lever, a fluid pressure operated rod connected to said arm, and means for limiting forward movement of the car under operation of the rod to cause the lever to tip and clamp the coil.

16. In a device for rolling metal, a pair of rolls, means for coiling a strip as it leaves the rolls, a storage conveyor for receiving the coils from the coiler, means associated with the conveyor for pulling out and straightening the tail end of a coil comprising means for clamping the coil against turning, means for gripping the free end of the coil and pulling it away from the coil, a curved form, and means for bending the pulled out end over the curved form.

17. In a device for rolling metal, a pair of rolls, means for coiling the strip as it leaves the rolls, and means for pulling out and straightening the tail end of the coiled strip comprising means for clamping the coil against turning, a hook to engage the free end of the coil, means for drawing the hook away from the coil to pull out the tail end of the coil, a curved form, and means for rolling the pulled out end over said form.

18. In a device for rolling metal, a pair of rolls, means for coiling the strip as it leaves the rolls, and means for pulling out and straightening the tail end of the coiled strip comprising means for clamping the coil against turning, means for pulling the free end away from the coil, a curved form, a roll mounted to reciprocate toward and from the form, a pivoted support for the roll to permit it to run over the form, means for shifting the roll to carry the pulled out end of the coil against the form, and means for swinging the support on its pivot while the roll is against the form to roll the pulled out end portion over said form.

19. In a device for rolling metal, a pair of rolls, means for coiling the strip as it leaves the rolls, and means for pulling out and straightening the tail end of the coiled strip comprising means for clamping the coil against turning, a hook to engage the free end of the coil, a fluid pressure cylinder to shift the hook to draw out said free end from the coil, a curved form, a roll, a fluid pressure cylinder for drawing the roll against the drawn out end portion to press it against the form, and means to shift the roll while in this position to roll the end portion against the form.

20. In a device for rolling metal, a pair of rolls, means for coiling a strip as it leaves the rolls, a storage conveyor extending rearward of the coiler to receive the coiled strips, means for drawing out and straightening the tail end portion of the strip, a storage conveyor for conveying the coils with the straightened tail end portions to the front of the rolls, a support forwardly of the rolls for a coil, means for transferring a coil from said second conveyor to said support with said tail end in an upright position, and means movable forwardly toward the rolls to position said tail end and insert it between the rolls.

21. In a device for rolling metal, a pair of rolls, means for coiling a strip as it leaves the mill, storage conveyors for the coils at the rear of the mill, means for pulling out and straightening the tail ends of the coils, means at the front of the mill comprising a reciprocable carriage, a support for a coil on said carriage, means for transferring a coil from one of said conveyors to said support, a second reciprocable carriage, means on the second carriage for positioning the free tail end portion of a coil on said support, and means for advancing the carriage toward the rolls to stick said free end portion between the rolls.

22. In a device for rolling metal, a pair of rolls, means for coiling a strip as it leaves the rolls, means for drawing out and straightening the tail end portion of the coil, a reciprocable carriage at the front of the rolls, a support for a coil on said carriage, means for transferring a coil with the straightened tail end portion to said support, a guide on the carriage for said strip, a second reciprocable carriage, means on the second carriage to engage said free end and position it in the guide, and means for shifting the carriages toward the rolls in succession to first position the free end portion in the guide and then insert it between the rolls.

23. In a device for rolling metal, a pair of rolls, means at the front of the rolls for feeding the metal thereto, a coiler at the rear of the rolls for coiling the strip as it leaves the rolls, means for pulling out and straightening the tail end of the coil, means for returning the coil to a position in front of the rolls, and means for sticking the straightened end between the rolls.

24. In combination, a support for a coil of strip metal, means for clamping a coil on said support comprising a reciprocating car, a lever pivoted on said car, a clamping block carried by the forward arm of the lever, a counterweight carried by the rear arm of the lever and of a weight to overbalance the clamping block, an upright arm on the lever, and power means connected to the latter arm for operating the lever and reciprocating the car.

25. In combination, a support for a coil of strip metal, means for clamping a coil on the support comprising a reciprocating car, means carried by the car for pushing the coil longitudinally of its axis, a lever pivoted to the car, a clamping block carried by one arm of the lever, an over-balancing weight carried by the other arm, an upright arm on the lever, a fluid pressure operated rod connected to said arm, and means for limiting forward movement of the car under operation of the rod to cause the lever to tip and clamp the coil.

26. In combination, means for pulling out and straightening the tail end of a coil of strip metal comprising means for clamping the coil against turning, means for gripping the free end of the coil and pulling it away from the coil, a curved form, and means for bending the pulled out end over the curved form.

27. In combination, means for pulling out and straightening the tail end of a coiled strip of metal comprising means for clamping the coil against turning, a hook to engage the free end of the coil, means for drawing the hook away from the coil to pull out the tail end of the coil, a curved form, and means for rolling the pulled out end over said form.

28. In combination, means for pulling out and straightening the tail end of a coiled strip of metal comprising means for clamping the coil against turning, means for pulling the free end away from the coil, a curved form, a roll mounted to reciprocate toward and from the form, a pivoted support for the roll to permit it to run over the form, means for shifting the roll to carry the pulled out end of the coil against the form, and means for swinging the support on its pivot while the roll is against the form to roll the pulled out end portion over the form.

29. In combination, means for pulling out and straightening the tail end of a coiled strip of metal comprising means for clamping the coil against turning, a hook to engage the free end of the coil, a fluid pressure cylinder to shift the hook to draw out said free end from the coil, a curved form, a roll, a fluid pressure cylinder for drawing the roll against the drawn out end portion to press it against the form, and means to shift the roll while in this position to roll the end portion against the form.

30. In combination, a pair of rolls, means at the front of the rolls comprising a reciprocable carriage, a support on said carriage for a coil of strip metal having a pulled out straightened tail end, a second reciprocable carriage, means on the second carriage for positioning the free tail end portion of the coil on said support, and means for advancing the carriages toward the rolls to stick said free end portion between the rolls.

31. In combination, a pair of rolls, means for pulling out and straightening the tail end portion of a coiled strip of metal, a support forwardly of the rolls for a coil, means for transferring a coil from the straightening means to said support, means movable forwardly toward the rolls to position said tail end and insert it between the rolls, and means to move the coil and its support forwardly with said latter means.

32. In combination, a pair of rolls, means for drawing out and straightening the tail end portion of a coil of strip metal, a reciprocable carriage at the front of the rolls, a support for a coil on said carriage, means for transferring a coil with the straightened tail end portion to said support, a guide on the carriage for said strip, a second reciprocable carriage, means on the second carriage to engage said tail end and position it in the guide, and means for shifting the carriages toward the rolls in succession to first position the tail end portion in the guide and then insert it between the rolls.

33. In combination, means for operating on a strip of sheet metal, a reciprocating carriage forwardly of said means, a support on said carriage for a coil of strip metal having a tail end pulled out away from the coil, a second reciprocable carriage, means on the second carriage for positioning the free tail end portion of the coil on the support, and means for advancing the carriages toward the first mentioned means to stick the free end portion into said means.

34. In combination, means for operating on a strip of sheet metal, means for pulling out and straightening the tail end portion of a coiled strip of metal, a support forwardly of the first mentioned means for a coil, means for transferring a coil from the straightening means to said support, means movable forwardly toward said first mentioned means to position said tail end and insert it in said means, and means mounting the support so that it and the coil move forwardly as the tail end is inserted.

35. In combination, means for operating on a strip of sheet metal, means for drawing out and straightening the tail end portion of a coil of strip metal, a reciprocable carriage forwardly of said first mentioned means, a support for a coil on said carriage, means for transferring a coil with the straightened tail end portion to said support, a guide on the carriage for said strip, a second reciprocable carriage, means on the second carriage to engage said free end and position it in the guide, and means for shifting the carriages toward the first mentioned means in succession to first position the free end portion in the guide and then insert it in said means.

JAMES R. COE.